United States Patent
Takizawa et al.

(10) Patent No.: US 11,401,998 B2
(45) Date of Patent: Aug. 2, 2022

(54) ACTUATOR

(71) Applicant: MITSUBA Corporation, Gunma (JP)

(72) Inventors: Takashi Takizawa, Gunma (JP); Naoya Takeuchi, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/347,572

(22) Filed: Jun. 14, 2021

(65) Prior Publication Data

US 2021/0388885 A1 Dec. 16, 2021

(30) Foreign Application Priority Data

Jun. 16, 2020 (JP) .............................. JP2020-103503

(51) Int. Cl.
| | |
|---|---|
| *F16H 1/32* | (2006.01) |
| *F16H 57/08* | (2006.01) |
| *F16H 25/20* | (2006.01) |
| *F16H 1/46* | (2006.01) |

(52) U.S. Cl.
CPC .............. *F16H 1/32* (2013.01); *F16H 1/46* (2013.01); *F16H 25/20* (2013.01); *F16H 57/082* (2013.01); *F16H 2025/2075* (2013.01)

(58) Field of Classification Search
CPC ... H02K 7/06; H02K 7/116; B60J 5/10; F16H 25/20; F16H 57/082; F16H 1/32; F16H 1/46; F16H 2025/2075
USPC ...................................................... 475/162
See application file for complete search history.

(56) References Cited

U.S. PATENT DOCUMENTS

| | | | | |
|---|---|---|---|---|
| 4,366,727 A * | 1/1983 | Jonsson | ................... | F16H 1/46 475/342 |
| 4,491,038 A * | 1/1985 | Kraus | ..................... | F16H 13/06 475/183 |
| 5,660,591 A * | 8/1997 | Reynolds | ................. | F16D 3/74 277/912 |
| 5,679,089 A * | 10/1997 | Levedahl | ............ | F16H 57/0006 74/411 |
| 7,443,121 B2 * | 10/2008 | Nagai | ...................... | H02K 7/06 318/434 |
| 9,776,483 B2 * | 10/2017 | Shchokin | ................ | F16H 25/20 |
| 10,544,615 B2 * | 1/2020 | Takizawa | ................ | F16H 25/20 |
| 10,641,028 B2 * | 5/2020 | Takizawa | .............. | E05F 15/622 |
| 10,767,412 B2 * | 9/2020 | Scheuring | ............ | E05F 15/622 |
| 10,900,270 B2 * | 1/2021 | Takizawa | ................ | B60J 5/101 |
| 2020/0165856 A1 * | 5/2020 | Scheuring | ................ | F16H 1/46 |

FOREIGN PATENT DOCUMENTS

JP 2018082516 5/2018

* cited by examiner

*Primary Examiner* — Leslie A Nicholson, III
(74) *Attorney, Agent, or Firm* — JCIPRNET

(57) ABSTRACT

An actuator is provided, in which second support shafts are protruded to an output shaft side in an axial direction of a second planetary carrier. A power transmission member having convex portions which are protruded radially outward and receive rotation forces from the second support shafts are arranged on a second planetary carrier side of the output shaft in the axial direction. An elastic member is arranged between the second support shafts and the convex portions in a rotation direction of the output shaft. Therefore, the rotation force of the second planetary carrier due to rotation drive of an electric motor is transmitted from the second support shafts to the convex portions of the power transmission member via the elastic member.

6 Claims, 8 Drawing Sheets

90: deceleration mechanism (deceleration gear portion)
94d: second planetary carrier (planetary carrier)
94e: second support shaft (support shaft)
95: output shaft (drive shaft)
100: elastic member
110: power transmission member
111: convex portion

ACTUATOR

CROSS-REFERENCE TO RELATED APPLICATION

This application claims the priority benefit of Japan application serial no. 2020-103503, filed on Jun. 16, 2020. The entirety of the above-mentioned patent application is hereby incorporated by reference herein and made a part of this specification.

BACKGROUND

Technical Field

The disclosure relates to an actuator which has a motor portion in which a rotation shaft is arranged, a drive shaft which drives an object to be driven, and a deceleration gear portion which is arranged between the rotation shaft and the drive shaft.

Related Art

For example, an actuator which opens and closes a tailgate of an automobile is described in Patent literature 1. The actuator described in Patent literature 1 includes: a motor portion, a screw shaft, a deceleration gear portion which is disposed between the motor portion and the screw shaft, and a nut member which is moved in an axial direction of this screw shaft by rotation of the screw shaft to extend and contract the actuator. Thereby, by driving the motor portion, the actuator is extended and contracted to open and close the tailgate.

LITERATURE OF RELATED ART

Patent Literature

[Patent literature 1] Japanese Patent Laid-Open No. 2018-082516

However, the actuator described in the above Patent literature 1 is an actuator having an elongated rod shape, and thus a compact and two-stage planetary gear mechanism is used in the deceleration gear portion. That is, the deceleration gear portion includes a pair of sun gears, a pair of internal gears, a plurality of planetary gears, and a pair of planetary carriers. Therefore, in the deceleration gear portion which includes the two-stage planetary gear mechanism having a large number of components, a rotation shake during rotation drive of the motor portion is great, and periodic noise is generated according to the rotation speed of the motor portion, making the noise difficult to suppress.

SUMMARY

The actuator of the disclosure has: a motor portion in which a rotation shaft is arranged, a drive shaft which drives an object to be driven, and a deceleration gear portion which is arranged between the rotation shaft and the drive shaft. The deceleration gear portion includes: a sun gear which is rotated by the rotation shaft, an internal gear which is arranged around the sun gear, a plurality of planetary gears which are arranged between the sun gear and the internal gear, and a planetary carrier which is equipped with a plurality of support shafts respectively rotatably supporting the plurality of planetary gears, and rotates the drive shaft. The support shafts are protruded to a drive shaft side in an axial direction of the planetary carrier. A power transmission member having a plurality of convex portions which are protruded radially outward and receive rotation forces from the support shafts are arranged on a planetary carrier side of the drive shaft in the axial direction. An elastic member is arranged between the support shafts and the convex portions in a rotation direction of the drive shaft.

DESCRIPTION OF THE EMBODIMENTS

An embodiment of the disclosure is described below in detail with reference to drawings.

The disclosure provides an actuator capable of suppressing the generation of the periodic noise due to the rotation shake of the deceleration gear portion to improve a silent property.

According to the disclosure, the support shafts are protruded to the drive shaft side in the axial direction of the planetary carrier, the power transmission member having the convex portions which are protruded radially outward and receive the rotation forces from the support shafts are arranged on the planetary carrier side of the drive shaft in the axial direction, and the elastic member is arranged between the support shafts and the convex portions in the rotation direction of the drive shaft.

Therefore, the rotation force of the planetary carrier due to the rotation drive of the motor portion is transmitted from the support shafts to the convex portions of the power transmission member via the elastic member. Thus, the generation of the periodic noise due to the rotation shake of the deceleration gear portion can be suppressed by elastic deformation of the elastic member to improve the silent property of the actuator.

Figure 1:
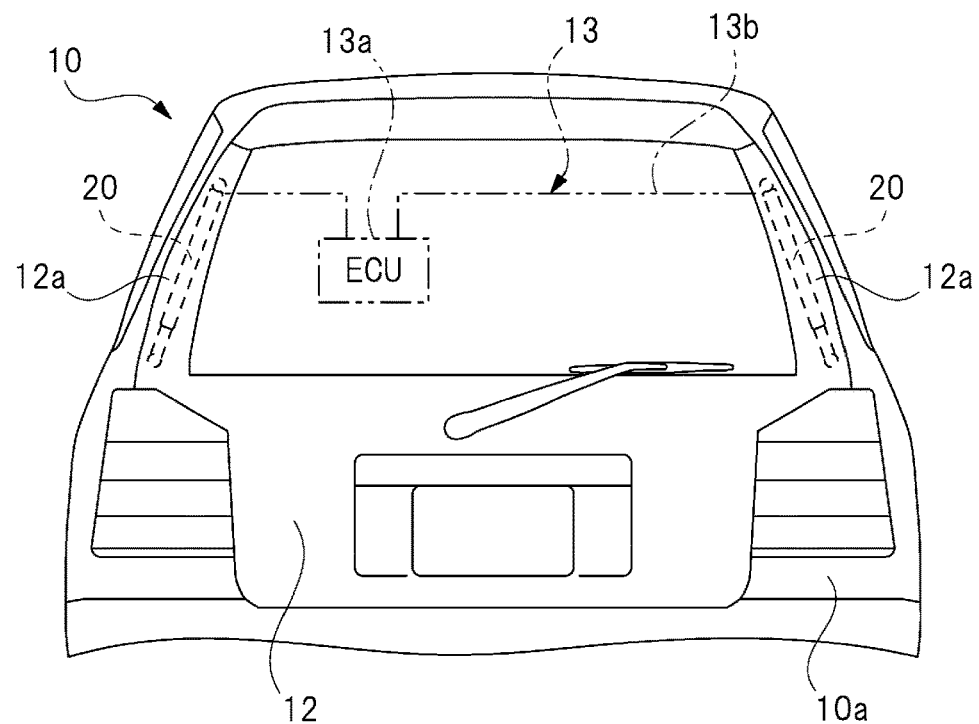
FIG. 1 is a front view showing a tailgate of a vehicle.
Figure 2:
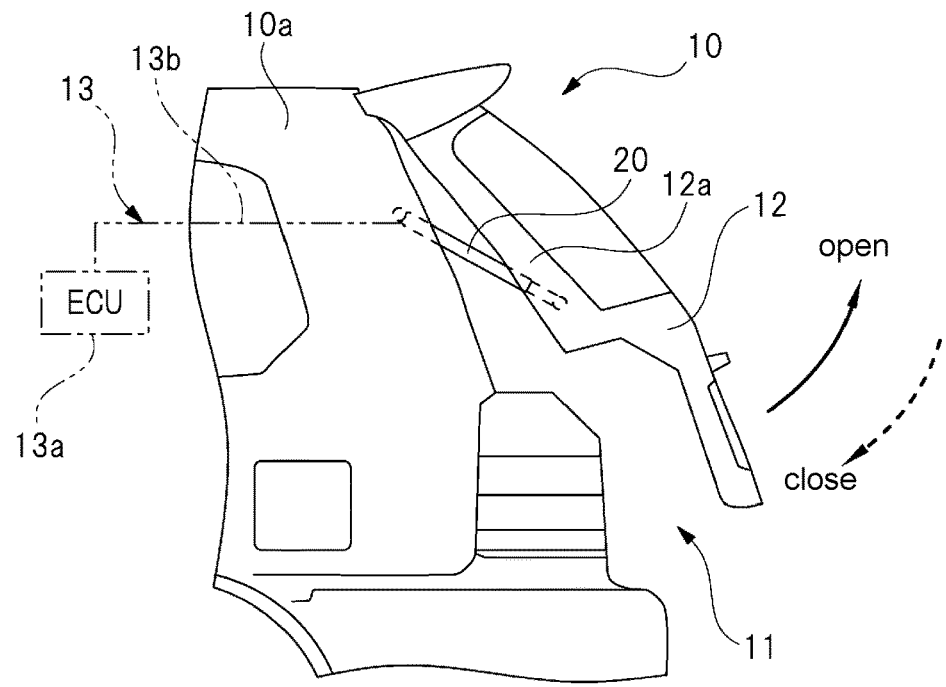
FIG. 2 is a side view of the tailgate in FIG. 1 as viewed from a side.
Figure 3:
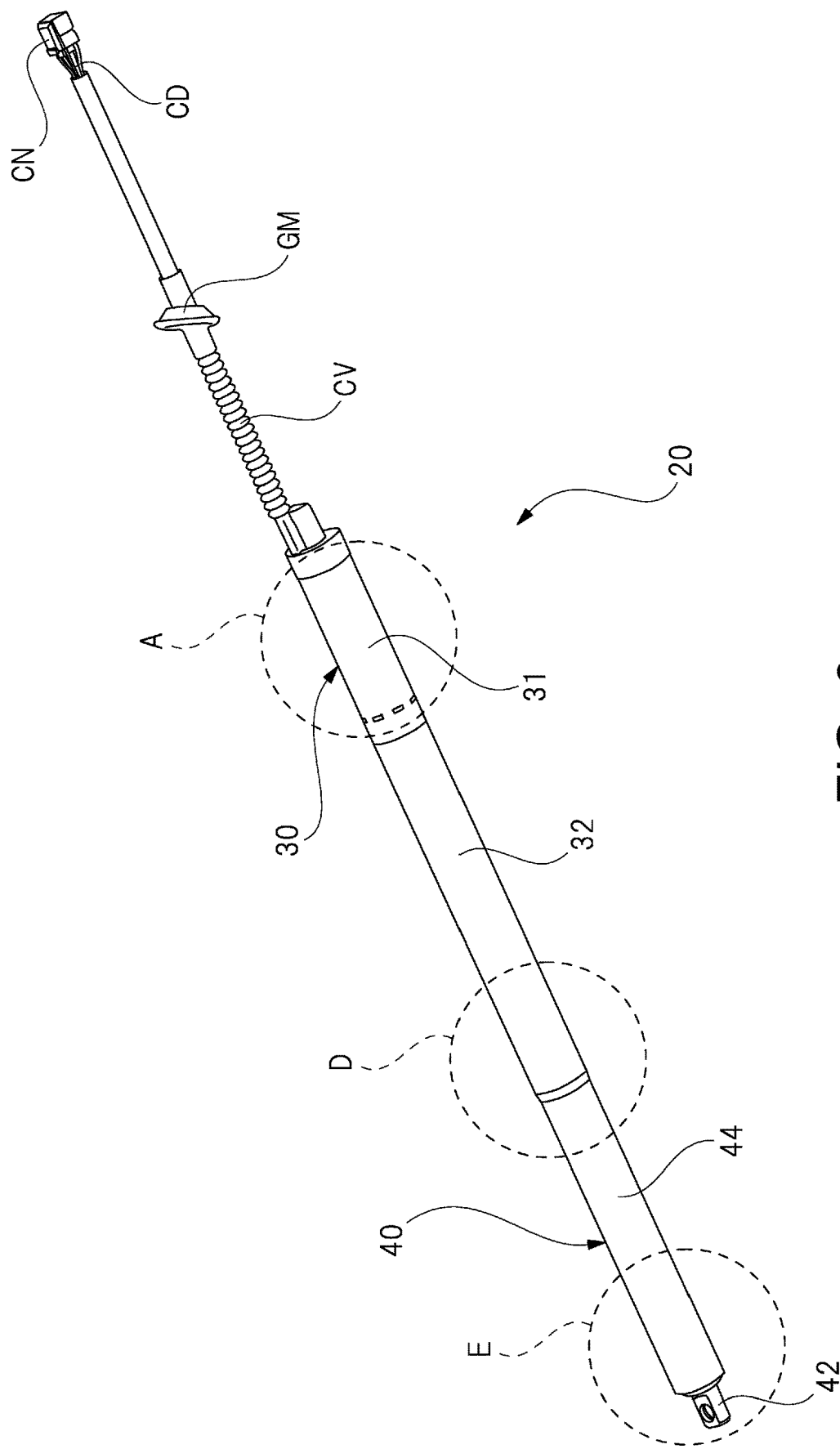
FIG. 3 is a perspective view showing an actuator in a separate manner.
Figure 4:
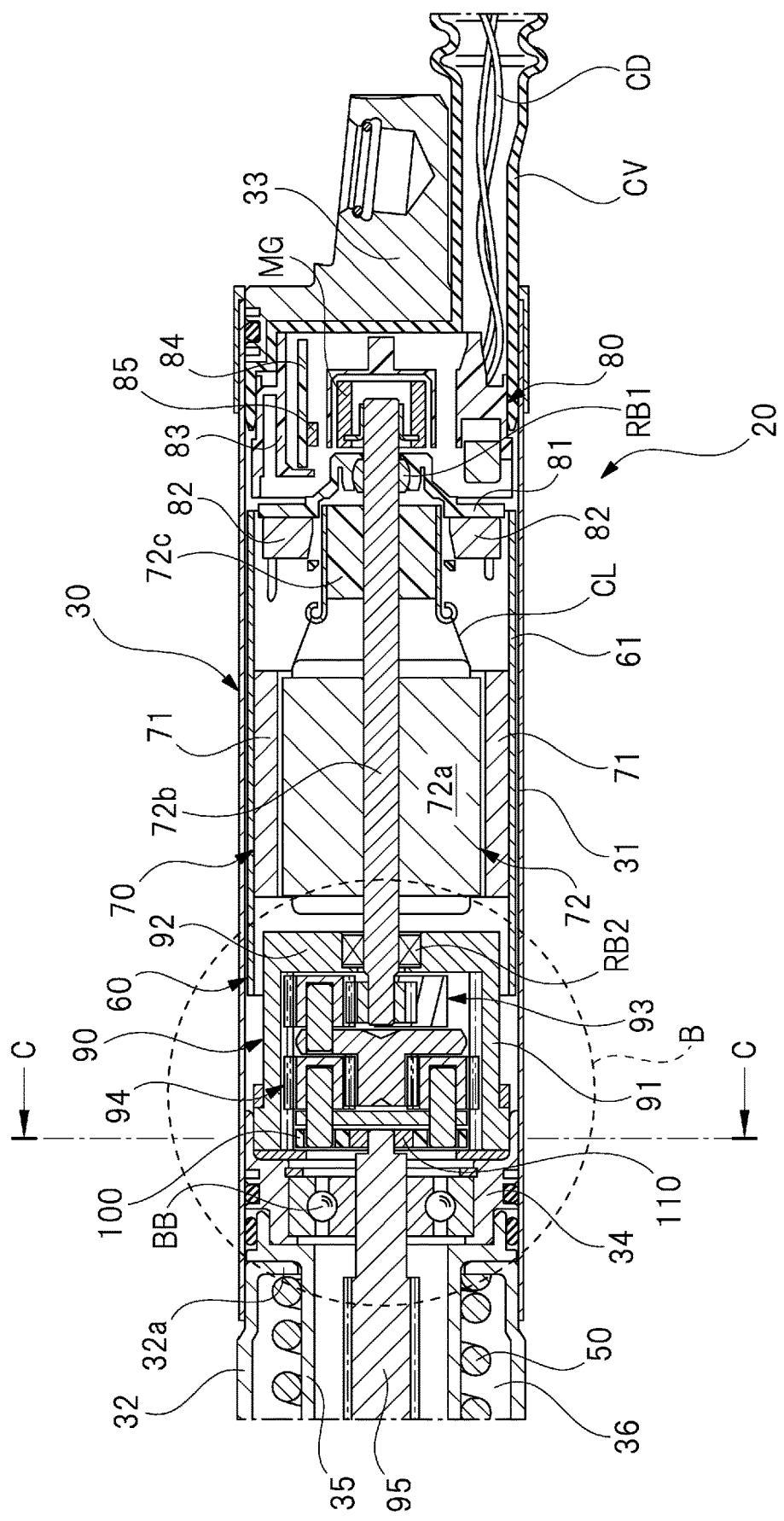
FIG. 4 is a cross-sectional view of a part taken along a broken line circle A in FIG. 3.
Figure 5:
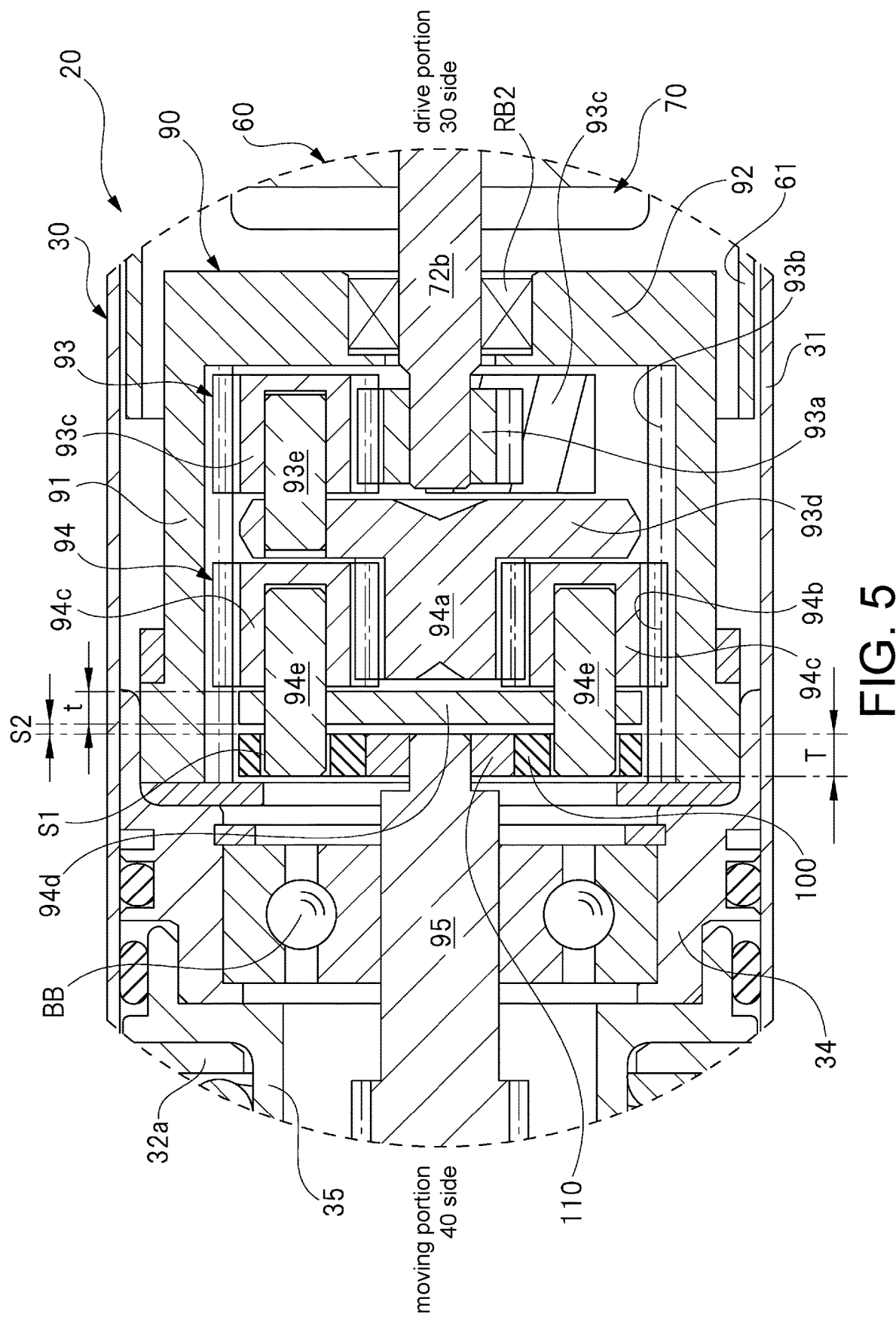
FIG. 5 is an enlarged cross-sectional view of a part taken along a broken line circle B in FIG. 4.
Figure 6:
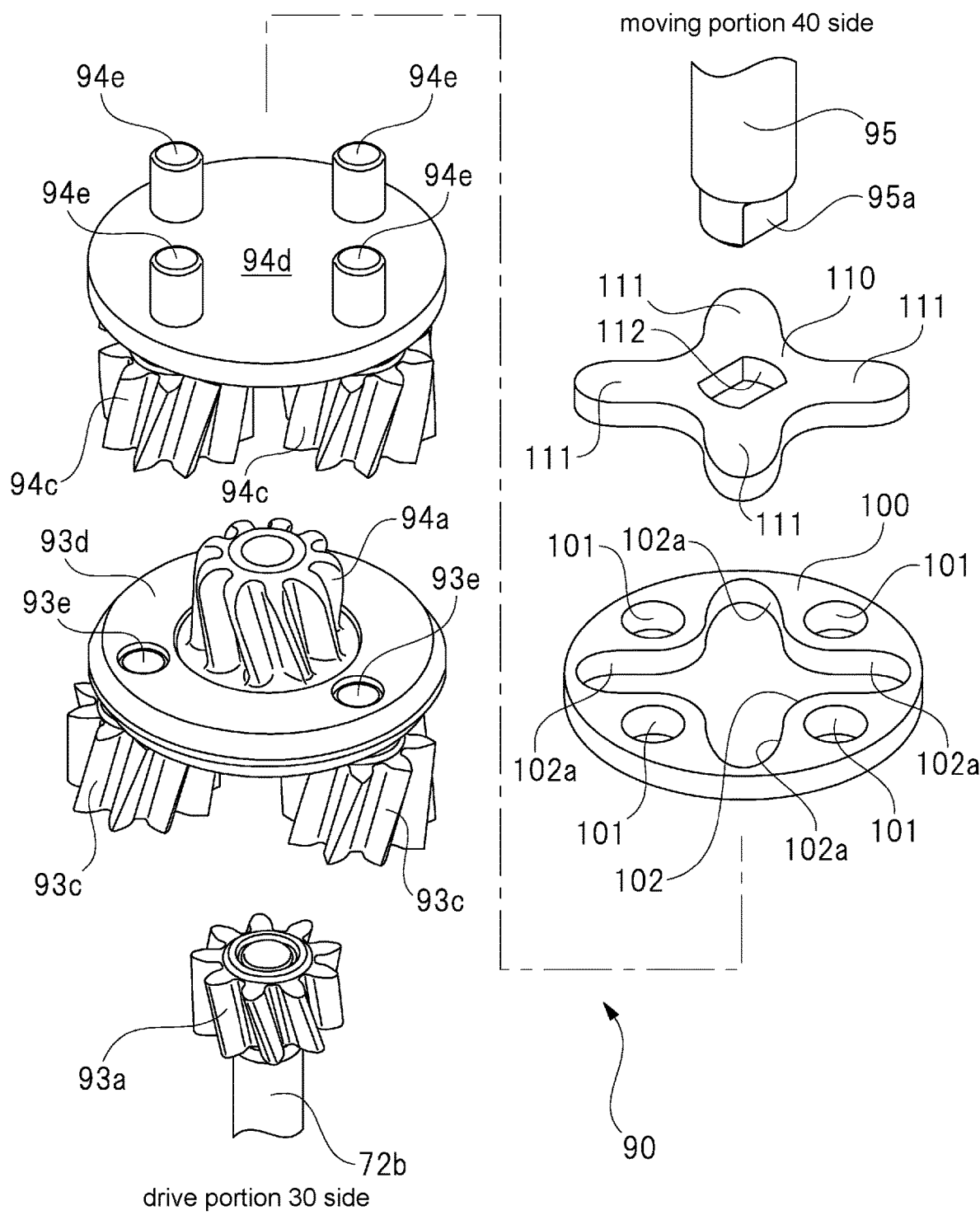
FIG. 6 is a perspective view showing a deceleration mechanism in an exploded manner.
Figure 7B:
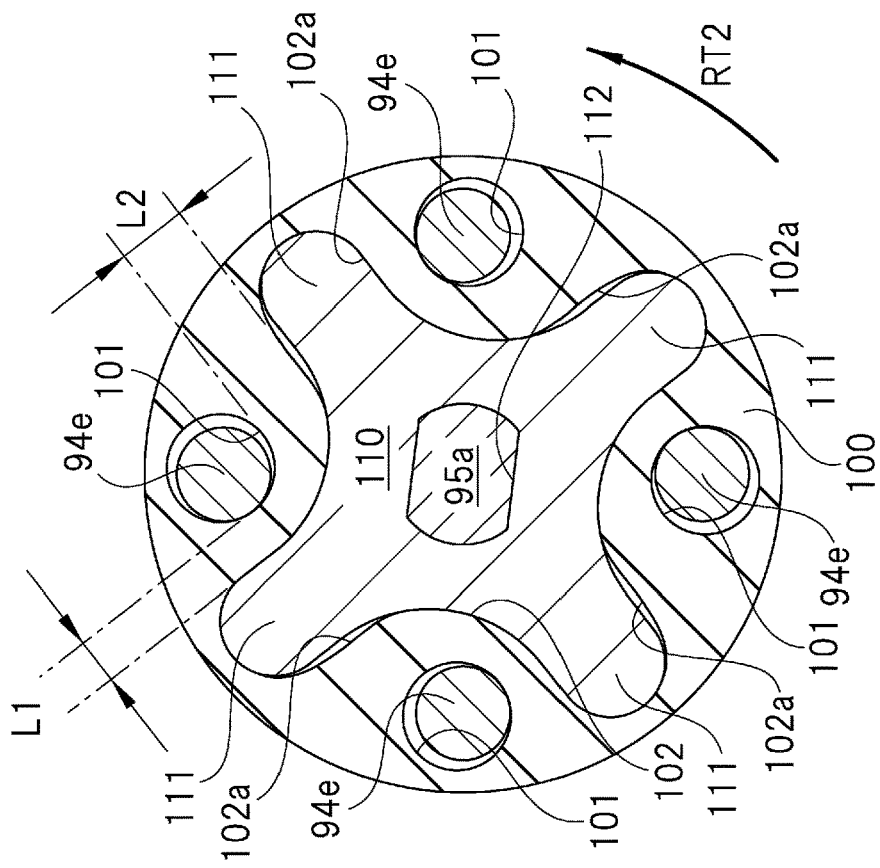
FIG. 7(*a*) and FIG. 7(*b*) are cross-sectional views along a line C-C in FIG. 4 for illustrating actions of an elastic member.
Figure 7A:
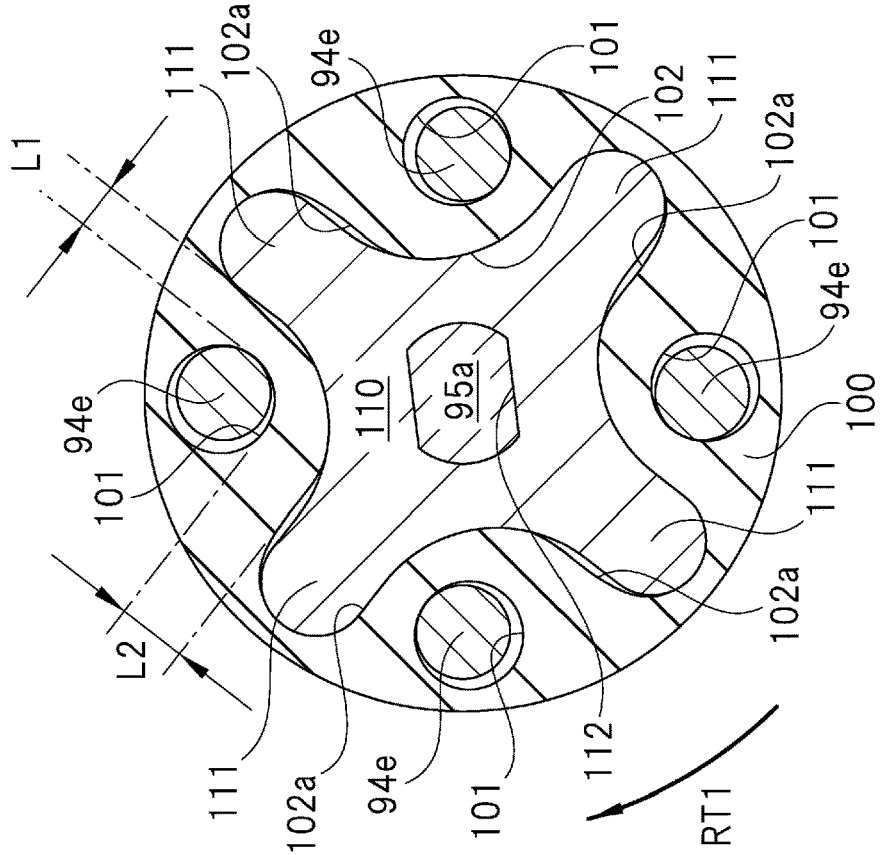
Figure 8:
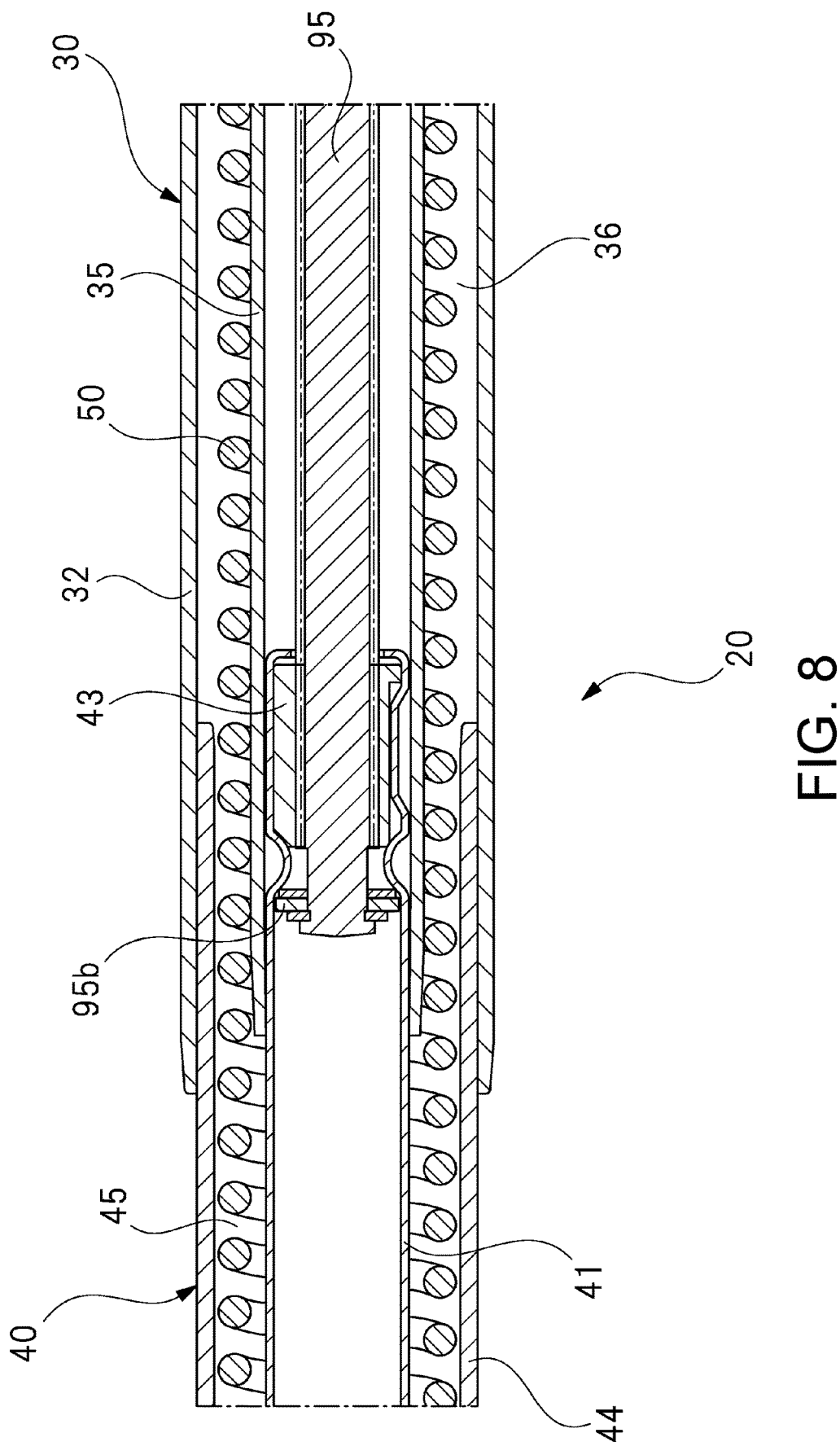
FIG. 8 is a cross-sectional view of a part taken along a broken line circle D in FIG. 3.
Figure 9:
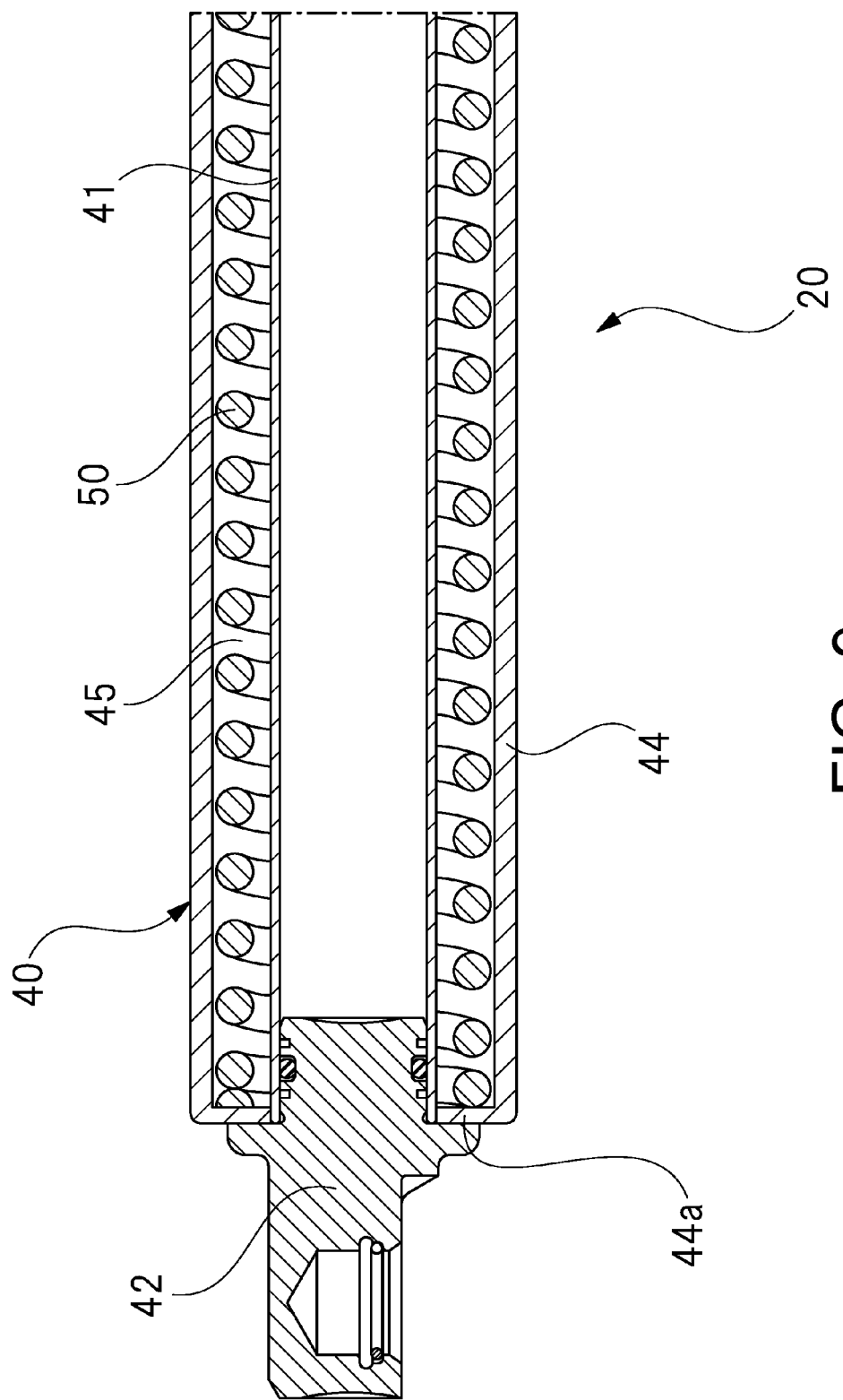
FIG. 9 is a cross-sectional view of a part taken along a broken line circle E in FIG. 3.

FIG. 1 is a front view showing a tailgate of a vehicle, FIG. 2 is a side view of the tailgate in FIG. 1 as viewed from a side, FIG. 3 is a perspective view showing an actuator in a separate manner, FIG. 4 is a cross-sectional view of a part taken along a broken line circle A in FIG. 3, FIG. 5 is an enlarged cross-sectional view of a part taken along a broken line circle B in FIG. 4, FIG. 6 is a perspective view showing a deceleration mechanism in an exploded manner, FIG. 7(*a*) and FIG. 7(*b*) are cross-sectional views along a line C-C in FIG. 4 for illustrating actions of an elastic member, FIG. 8 is a cross-sectional view of a part taken along a broken line circle D in FIG. 3, and FIG. 9 is a cross-sectional view of a part taken along a broken line circle E in FIG. 3.

A vehicle 10 shown in FIG. 1 and FIG. 2 is a so-called hatchback type vehicle, and an opening portion 11 which allows a large luggage in and out of the vehicle interior is formed on a rear side of the vehicle 10. The opening portion 11 is opened and closed as shown by a solid line arrow and a broken line arrow in FIG. 2 by a tailgate (an object to be driven and an opening/closing body) 12 revolved centered on a hinge (not shown) arranged on a rear side of a ceiling of the vehicle 10.

In addition, a tailgate opening/closing device 13 is mounted on the vehicle 10. The tailgate opening/closing device 13 includes a pair of actuators 20 which drives to open and close the tailgate 12, and a controller (ECU) 13a which controls the actuator 20 based on an operation signal of an operation switch (not shown).

Here, a pair of actuators 20 each has the same structure and is respectively disposed so as to be mirror-symmetrical on left and right sides of the vehicle 10. Specifically, in a state where the tailgate 12 is closed (see FIG. 1), each actuator 20 is accommodated in a narrow and elongated accommodation space (not shown) which is formed between a vehicle body 10a of the vehicle 10 and a door frame 12a of the tailgate 12.

As shown in FIG. 1 and FIG. 2, the actuator 20 is connected to the controller 13a via a wiring 13b, and is actioned to extend and contract by the supply of a drive current from the controller 13a. Thereby, the closed tailgate 12 is opened as shown by the solid line arrow by actuating the actuator 20 to extend, and the opened tailgate 12 is closed as shown by the broken line arrow by actuating the actuator 20 to contract.

As shown in FIGS. 3 to 9, the actuator 20 includes a drive portion 30, a moving portion 40 which is moved in an axial direction by the drive of the drive portion 30, and a coil spring 50 which is disposed between the drive portion 30 and the moving portion 40. The drive portion 30, the moving portion 40, and the coil spring 50 are respectively disposed on the same axis, and the actuator 20 is formed in an elongated rod shape.

The drive portion 30 includes a first housing 31 and a second housing 32 which are formed in a tubular shape, and the first housing 31 and the second housing 32 are connected to each other. One side of the first housing 31 in a longitudinal direction (a right side in the figure) is closed by a first fixation portion 33 which is turnably attached to the vehicle body 10a (see FIG. 1 and FIG. 2). In addition, a bearing holder 34 which holds a ball bearing BB is fixed to the other side of the first housing 31 in the longitudinal direction (a left side in the figure).

A drive mechanism 60 is accommodated inside the first housing 31 and between the first fixation portion 33 and the bearing holder 34. Here, the ball bearing BB turnably supports a base end portion of an output shaft 95 which forms the drive mechanism 60. Moreover, the output shaft 95 is a so-called "trapezoidal screw" that functions as a male screw member, and configures a drive shaft in the disclosure.

A base end portion of the holding tube 35 is fixed to a side opposite to a drive mechanism 60 side along the axial direction of the bearing holder 34 (a left side in the figure). The holding tube 35 movably holds a piston tube 41 (see FIG. 8 and FIG. 9) forming the moving portion 40, and the piston tube 41 enters and exits a front end portion of the holding tube 35 (the actuator 20 is extended and contracted) by driving the drive mechanism 60.

Here, an outer diameter dimension of the holding tube 35 is smaller than an inner diameter dimension of the first housing 31 and the second housing 32. Thereby, a first ring-like space 36 is formed between the second housing 32 and the holding tube 35.

One side of the coil spring 50 in the longitudinal direction is accommodated inside the first ring-like space 36. Moreover, a ring-like first spring seat 32a protruded radially inward is arranged in a base end portion of the second housing 32, and the first spring seat 32a supports one side of the coil spring 50 in the longitudinal direction.

Here, a wiring cover CV which is made of rubber and covers a wiring CD is integrally arranged in the first fixation portion 33 which closes one side of the first housing 31 in the longitudinal direction. Besides, as shown in FIG. 3, the wiring CD is extracted from one side of the wiring cover CV in the longitudinal direction, and a connector connection portion CN is arranged on one side of this wiring CD in the longitudinal direction. An external connector (not shown) on a vehicle 10 side is connected to the connector connection portion CN. Moreover, a grommet GM mounted on the vehicle body 10a is arranged at the wiring cover CV, and thereby rainwater or the like is prevented from entering a space inside the vehicle body 10a.

On the other hand, as shown in FIG. 4, a brush holder 80 disposed close to the first fixation portion 33 is electrically connected to the other side of the wiring CD in the longitudinal direction. Thereby, the drive current from the controller 13a (see FIG. 1 and FIG. 2) is supplied to the brush holder 80 (the drive mechanism 60) via the external connector, the connector connection portion CN, and the wiring CD.

The drive mechanism 60 includes a motor case 61 formed in a tubular shape. An electric motor (a motor portion) 70 is accommodated inside the motor case 61, and the brush holder 80 and a deceleration mechanism (a deceleration gear portion) 90 are respectively arranged on both sides of the motor case 61 in the axial direction.

The electric motor 70 is disposed in the central part of the motor case 61 in the longitudinal direction, and includes a plurality of permanent magnets 71 (only two permanent magnets 71 are shown in the figure) fixed to an inner wall of the motor case 61. A rotor 72 is rotatably arranged on an inner side of these permanent magnets 71 via a predetermined gap (an air gap). The rotor 72 includes an armature 72a formed by laminating a plurality of steel plates, a rotation shaft 72b fixed to a rotation center of the armature 72a, and a commutator 72c fixed to the rotation shaft 72b.

Here, a plurality of coils CL are wound in a predetermined winding method and a predetermined winding number on the armature 72a having the rotation shaft 72b. Besides, end portions of these coils CL and the commutator 72c arranged at the armature 72a are electrically connected to each other. Besides, a pair of electricity supply brushes 82 is in sliding contact with an outer peripheral part of the commutator 72c. Thereby, the armature 72a (the rotation shaft 72b) is rotated at a predetermined rotation speed in a predetermined rotation direction by supplying the drive current from the pair of electricity supply brushes 82 to the commutator 72c.

The brush holder 80 is formed in a bottomed tubular shape by injection-molding a molten plastic material or the like, and is disposed so as to close one side of the motor case 61 in the longitudinal direction. The brush holder 80 includes a holder main body 81 formed in a substantially circular plate shape, and a pair of electricity supply brushes 82 is movably arranged on the other side of the holder main body 81 in the axial direction (a left side in the figure). Specifically, the pair of electricity supply brushes 82 is respectively pressed against the commutator 72c at a predetermined pressure by a spring force of a brush spring (not shown).

In addition, the brush holder 80 includes a tubular wall portion 83 integrally arranged in the holder main body 81. A sensor substrate 84 is arranged inside the tubular wall portion 83 in a radial direction, and a hall IC 85 is implemented in this sensor substrate 84. Besides, a sensor magnet MG fixed to one side of the rotation shaft 72b in the axial direction is disposed facing a front surface of the hall IC 85. Thereby, the hall IC 85 detects the rotation state (the rotation direction, the rotation speed, and the like) of the rotation shaft 72b and sends the rotation state to the controller 13a via the wiring CD. Thus, the controller 13a can precisely control the extension and contraction action of the actuator 20.

Moreover, in addition to the pair of electricity supply brushes 82 and the sensor substrate 84, the brush holder 80 is also equipped with a plurality of electronic components (not shown). For example, a choke coil which prevents electrical brush noise from being emitted to the outside of the actuator 20, a PTC thermistor which prevents the electric motor 70 from becoming into an overheating state and burning out, and the like (all are not shown) are arranged in the brush holder 80.

Furthermore, a first radial bearing RB1 made of a ring-like steel material is mounted on the holder main body 81 of the brush holder 80. The first radial bearing RB1 rotatably supports the one side of the rotation shaft 72b in the axial direction.

The deceleration mechanism 90 includes a deceleration mechanism holder 91 formed in a bottomed tubular shape. A second radial bearing RB2 is mounted on a bottom wall portion 92 of the deceleration mechanism holder 91, and this second radial bearing RB2 rotatably supports the other side of the rotation shaft 72b in the axial direction. Moreover, the deceleration mechanism holder 91 is disposed so as to close the other side of the motor case 61 in the longitudinal direction.

As shown in FIGS. 4 to 6, a first deceleration mechanism 93 and a second deceleration mechanism 94 are respectively arranged side by side in the axial direction of the deceleration mechanism 90 inside the deceleration mechanism holder 91. Each of the first deceleration mechanism 93 and the second deceleration mechanism 94 is a planetary gear deceleration machine. Besides, the first deceleration mechanism 93 is disposed on a drive portion 30 side (an input side), and the second deceleration mechanism 94 is disposed on a moving portion 40 side (an output side). That is, the deceleration mechanism 90 is arranged to be capable of transmitting power between the rotation shaft 72b and the output shaft 95. Thereby, the rotation speed of the rotation shaft 72b rotating at a high speed is reduced to a predetermined rotation speed, and a rotation force which is increased to high torque due to the speed reduction is output from the output shaft 95.

In this way, the deceleration mechanism 90 performs two-step deceleration by the first deceleration mechanism 93 and the second deceleration mechanism 94. Therefore, the first deceleration mechanism 93 and the second deceleration mechanism 94 are respectively miniaturized (reduced in the diameter), and can be set inside the tubular first housing 31.

The first deceleration mechanism 93 includes a first sun gear 93a fixed to the other side of the rotation shaft 72b in the axial direction. That is, the first sun gear 93a is rotated at the same rotation speed as the rotation shaft 72b. In addition, a ring-like first internal gear 93b is arranged around the first sun gear 93a, and this first internal gear 93b is formed by an inner wall of the deceleration mechanism holder 91, and is fixed to the first housing 31. That is, the first internal gear 93b is not rotated by the rotation of the rotation shaft 72b.

A total of three first planetary gears 93c are arranged between the first sun gear 93a and the first internal gear 93b. These first planetary gears 93c are respectively meshed with both the first sun gear 93a and the first internal gear 93b. Besides, the total of three first planetary gears 93c are disposed around the first sun gear 93a at equal intervals (120-degree intervals), and roll around the first sun gear 93a as the first sun gear 93a rotates.

In addition, a first planetary carrier 93d formed in a substantially circular plate shape is rotatably arranged on a side opposite to a bottom wall portion 92 side of the first sun gear 93a and the first planetary gear 93c in the axial direction. Besides, a total of three first support shafts 93e are integrally arranged in the first planetary carrier 93d. Specifically, the first support shaft 93e is made of a round steel rod, and the other side thereof in the axial direction is inserted and fixed to the first planetary carrier 93d. Besides, each of the first support shafts 93e is disposed at equal intervals (120-degree intervals) in the circumferential direction of the first planetary carrier 93d, and rotatably supports the first planetary gear 93c. Thereby, as each first planetary gear 93c rolls, the first planetary carrier 93d is rotated in a state of being decelerated to have a higher torque than that of the first sun gear 93a.

The second deceleration mechanism 94 includes a second sun gear 94a fixed to an axial center of the first planetary carrier 93d. That is, the second sun gear 94a is rotated at the same rotation speed as the first planetary carrier 93d. In addition, a ring-like second internal gear 94b is arranged around the second sun gear 94a, and this second internal gear 94b is formed by an inner wall of the deceleration mechanism holder 91, and is fixed to the first housing 31. That is, the second internal gear 94b does not rotate by the rotation of the first planetary carrier 93d.

Here, the second sun gear 94a integrally arranged in the first planetary carrier 93d configures a sun gear in the disclosure, and the second internal gear 94b configures an internal gear in the disclosure. That is, the second sun gear 94a is rotated by the rotation shaft 72b via the first deceleration mechanism 93.

In addition, a total of four second planetary gears 94c are arranged between the second sun gear 94a and the second internal gear 94b. These second planetary gears 94c configure planetary gears in the disclosure, and are respectively meshed with both the second sun gear 94a and the second internal gear 94b. Besides, the total of four second planetary gears 94c are disposed around the second sun gear 94a at equal intervals (90-degree intervals), and roll around the second sun gear 94a as the second sun gear 94a rotates.

Furthermore, a second planetary carrier 94d formed in a substantially circular plate shape is rotatably arranged on a side opposite to the bottom wall portion 92 side of the second sun gear 94a and the second planetary gear 94c in the axial direction. The second planetary carrier 94d configures a planetary carrier in the disclosure, and a total of four second support shafts 94e are integrally arranged in this second planetary carrier 94d. These second support shafts 94e configure support shafts in the disclosure. Specifically, the second support shaft 94e is made of a round steel rod, and the substantially central part thereof in the axial direction is inserted and fixed to the second planetary carrier 94d. Besides, each of the second support shafts 94e is disposed at equal intervals (90-degree intervals) in the circumferential direction of the second planetary carrier 94*d*, and the second planetary gear 94*c* is rotatably supported on one side of each second support shaft 94*e* in the axial direction. Thereby, as each second planetary gear 94*c* rolls, the second planetary carrier 94*d* is rotated in a state of being decelerated to have a higher torque than that of the second sun gear 94*a*.

In addition, as shown in FIG. 5, the other side of the total of four second support shafts 94*e* in the axial direction is protruded to an output shaft 95 side in the axial direction of the second planetary carrier 94*d*. Besides, an elastic member 100 as shown in FIG. 6 is mounted on the part of the second support shaft 94*e* protruded to the output shaft 95 side.

The elastic member 100 is formed in a substantially circular plate shape by a flexible material having flexibility such as natural rubber or the like. Besides, a total of four insertion holes 101 are arranged at equal intervals (90-degree intervals) in a circumferential direction of this elastic member 100 in a part close to the outside of the elastic member 100 in the radial direction. These insertion holes 101 configures the support shaft insertion holes in the disclosure, and the parts of the second support shafts 94*e* protruded to the output shaft 95 side are respectively inserted to each insertion hole 101 via a first gap S1 (see FIG. 5). That is, the first gap S1 is formed between the second support shaft 64*e* and the insertion hole 101. Thereby, the elastic member 100 is rotated at the same rotation speed as the second planetary carrier 94*d* of the second deceleration mechanism 94.

In addition, as shown in FIG. 6, an engagement hole 102 formed in a substantially cross shape is arranged in the central part of the elastic member 100. The engagement hole 102 includes a total of four concave portions 102*a* recessed radially outward of the elastic member 100. Besides, the insertion holes 101 are respectively disposed between these adjacent concave portions 102*a*. That is, a total of four concave portions 102*a* and a total of four insertion holes 101 are alternately arranged in the circumferential direction of the elastic member 100.

Furthermore, as shown in FIG. 5, the second gap S2 is arranged between the elastic member 100 and the second planetary carrier 94*d* in the axial direction of the deceleration mechanism 90. In this way, in the embodiment, the second support shaft 94*e* is inserted to the insertion hole 101 via the first gap S1, and the second gap S2 is arranged between the elastic member 100 and the second planetary carrier 94*d*. Moreover, the first gap S1 and the second gap S2 configure gaps in the disclosure.

Thereby, when the actuator 20 is assembled, the elastic member 100 can be easily mounted on each second support shaft 94*e* (assembly property is improved). In addition, when the actuator 20 is actuated, the elastic member 100 can be easily elastically deformed. In this case, even when the elastic member 100 is elastically deformed relatively greatly by the rotation force from each second support shaft 94*e*, a reaction force of the elastic member 100 is suppressed from acting in the axial direction of the second planetary carrier 94*d*. Thus, even when the load applied to the actuator 20 is large, smooth rotation of the deceleration mechanism 90 is ensured.

In addition, by the arrangement of the first gap S1 and the second gap S2 as described above, although a rotation shake of the deceleration mechanism 90 including the plurality of gears is allowed, because the second support shaft 94*e* made of metal is in contact with the elastic member 100, generation of periodic noise due to the rotation shake is suppressed. Therefore, for example, even when the deceleration mechanism is configured by inexpensive components, a silent property can be ensured, and eventually cost reduction can be realized.

Furthermore, as shown in FIG. 5 and FIG. 6, a power transmission member 110 which is formed in a substantially cross shape by steel plate punching processing or the like is engaged with the engagement hole 102 of the elastic member 100 in a fitting way. Besides, a thickness dimension of the elastic member 100 and a thickness dimension of the power transmission member 110 are respectively substantially the same thickness dimension T. Specifically, the thickness dimension T of the elastic member 100 and the power transmission member 110 is about a thickness dimension t of the second planetary carrier 94*d* (T≈t). Thereby, a dimension increase of the actuator 20 in the axial direction is suppressed.

The power transmission member 110 includes a total of four convex portions 111 protruding radially outward the power transmission member 110. These convex portions 111 are parts (receiving portions) that receive the rotation force from each second support shaft 94*e*, and each of the convex portions 111 is respectively fitted to the concave portion 102*a* of the elastic member 100. That is, a part of the elastic member 100 is arranged (disposed) between the second support shaft 94*e* and the convex portion 111 in the rotation direction of the output shaft 95.

Thereby, by the relative rotation of the second planetary carrier 94*d* with respect to the power transmission member 110, a part of the elastic member 100 between the second support shaft 94*e* and the convex portion 111 is elastically deformed, and eventually the generation of the periodic noise due to the rotation shake of the deceleration mechanism 90 is suppressed.

Specifically, the elastic member 100 is elastically deformed as shown in FIG. 7(*a*) and FIG. 7(*b*). That is, by the relative rotation of each second support shaft 94*e* with respect to the power transmission member 110 in a direction of an arrow RT1 and a direction of an arrow RT2, a part of the elastic member 100 on a front side in the rotation direction is pressed (a load is applied) so as to have a thickness dimension L1. Meanwhile, a part of the elastic member 100 on a rear side in the rotation direction is unloaded to have a thickness dimension L2, that is, to a state that the elastic member 100 is in a natural state (L1<L2).

In addition, as shown in FIG. 6, FIG. 7(*a*), and FIG. 7(*b*), a connection hole 112 having a cross section formed in a non-circular shape (a substantially oval shape) is arranged in the central part of the power transmission member 110. A fixation protrusion 95*a* arranged on one side of the output shaft 95 in the axial direction (a lower side in FIG. 6) is firmly fixed to the connection hole 112 by press fitting. That is, the power transmission member 110 is arranged on a second planetary carrier 94*d* side of the output shaft 95 in the axial direction. Thereby, the output shaft 95 is rotated together with the power transmission member 110. Specifically, the rotation force of the deceleration mechanism 90 is transmitted from the total of four second support shafts 94*e* to the elastic member 100, and the rotation force transmitted to this elastic member 100 is transmitted to the power transmission member 110 via the total of four convex portions 111. As a result, the output shaft 95 is finally rotated (driven) in a state of being decelerated to have a high torque.

In this way, the elastic member 100 (made of rubber) is intervened between the second support shaft 94*e* (made of metal) fixed to the second planetary carrier 94*d* and the power transmission member 110 (made of metal) fixed to the output shaft 95. Thereby, the vibration from the deceleration mechanism 90 including the plurality of gears is suppressed from being transmitted to the tailgate 12 (see FIG. 1 and FIG. 2) via the output shaft 95. Therefore, rattling of the tailgate 12 is effectively suppressed, and the opening/closing sound of the tailgate 12 becomes quieter.

In addition, for example, when the actuator 20 is in an extended state, a relatively large load from the tailgate 12 is applied to this actuator 20, a stress acts on the actuator 20 in a bending direction, and the output shaft 95 becomes a state of being tilted with respect to the deceleration mechanism 90. In this case, the elastic member 100 between the second support shaft 94e and the power transmission member 110 is elastically deformed to allow the output shaft 95 to tilt with respect to the deceleration mechanism 90. Besides, even when the output shaft 95 is in a state of being tilted with respect to the deceleration mechanism 90, the actuator 20 is smoothly actioned to extend and contract without stopping. Thus, an unreasonable scooping force from the output shaft 95 is suppressed from being transmitted to the deceleration mechanism 90, and the plurality of gears forming the deceleration mechanism 90 are prevented from being worn and the like at an early stage. Thereby, the silent property of the actuator 20 is also improved.

Next, a structure of the moving portion 40 is described which is moved by the rotation of the output shaft 95 in the forward and reverse directions (directions of arrows RT1 and RT2 in FIG. 7(a) and FIG. 7(b)).

As shown in FIG. 8 and FIG. 9, the moving portion 40 includes the tubular piston tube 41 which enters and exits the front end portion of the holding tube 35 forming the drive portion 30. Besides, the other side of the piston tube 41 in the longitudinal direction (a left side in the figure) is closed by the second fixation portion 42 which is turnably attached to the tailgate 12 (see FIG. 1 and FIG. 2).

Meanwhile, a ring-like female thread member 43 coupled to the output shaft 95 by a screw is fixed to one side of the piston tube 41 in the longitudinal direction (a right side in the figure). Thereby, the piston tube 41 enters and exits the front end portion of the holding tube 35 as the output shaft 95 rotates in the forward and reverse directions. That is, the moving portion 40 moves with respect to the drive portion 30.

Here, a guide member 95b having a circular plate shape is fixed to the front end portion of the output shaft 95, and this guide member 95b is in sliding contact with an inner wall of the piston tube 41. That is, the guide member 95b has a function of moving the piston tube 41 straight with respect to the holding tube 35. Thereby, when the actuator 20 is actuated (during the extension and contraction), the bending of the actuator 20 due to the load from the tailgate 12 and the like is prevented, and eventually the smooth action of the actuator 20 is ensured.

In this way, the output shaft 95 serving as a drive shaft drives to open and close the tailgate 12 via the piston tube 41. That is, the output shaft 95 serving as the drive shaft drives the tailgate 12 serving as an object to be driven.

In addition, a third housing 44 formed in a tubular shape is arranged outside of the piston tube 41 in the radial direction. Besides, an outer peripheral part on one side of the third housing 44 in the axial direction is slidably mounted on the inner peripheral part of the second housing 32 in the drive portion 30. Specifically, the third housing 44 slides with respect to the second housing 32 as the piston tube 41 moves.

Here, an outer diameter dimension of the piston tube 41 is smaller than an inner diameter dimension of the third housing 44. Thereby, a second ring-like space 45 is formed between the third housing 44 and the piston tube 41.

The other side of the coil spring 50 in the longitudinal direction is accommodated inside the second ring-like space 45. Moreover, a ring-like second spring seat 44a protruded radially inward is arranged on the other side of the third housing 44 in the axial direction, and the second spring seat 44a is fixed to the second fixation portion 42 and supports the other side of the coil spring 50 in the longitudinal direction.

Besides, the coil spring 50 is disposed between the first spring seat 32a forming the drive portion 30 and the second spring seat 44a forming the moving portion 40 in a stretched in a protruding manner with a predetermined initial load applied. That is, the spring force of the coil spring 50 always acts in a direction in which the moving portion 40 is pushed out from the drive portion 30 (the direction in which the actuator 20 extends).

Thereby, in the state where the tailgate 12 is opened, the extending state of the actuator 20 is maintained even when a relatively large load is applied to the actuator 20 from the axial direction thereof. Thus, the tailgate 12 is prevented from being closed unexpectedly.

As specifically described above, according to the actuator 20 of the embodiment, the second support shaft 94e is protruded to the output shaft 95 side in the axial direction of the second planetary carrier 94d, the power transmission member 110 having the convex portion 111 which is protruded radially outward and receives the rotation force from the second support shaft 94e is arranged on the second planetary carrier 94d side of the output shaft 95 in the axial direction, and the elastic member 100 is arranged between the second support shaft 94e and the convex portion 111 in the rotation direction of the output shaft 95.

Therefore, the rotation force of the second planetary carrier 94d due to the rotation drive of the electric motor 70 is transmitted from the second support shaft 94e to the convex portion 111 of the power transmission member 110 via the elastic member 100. Thus, the generation of the periodic noise due to the rotation shake of the deceleration mechanism 90 can be suppressed by the elastic deformation of the elastic member 100 to improve the silent property of the actuator 20.

In addition, according to the actuator 20 of the embodiment, the elastic member 100 has the insertion hole 101 into which the second support shaft 94e is inserted and the engagement hole 102 with which the power transmission member 110 is engaged, and thus the second support shaft 94e included by the deceleration mechanism 90 is used, and the elastic member 100 composed of one component can be arranged between the second support shaft 94e and the power transmission member 110.

Thus, the single elastic member 100 can be disposed between the deceleration mechanism 90 and the output shaft 95 without increasing the size of the connection structure between the deceleration mechanism 90 and the output shaft 95, and eventually the stroke amount of the actuator 20 can be sufficiently ensured without deteriorating the assembly property of the actuator 20.

In addition, because the second support shaft 94e included by the deceleration mechanism 90 is used in the connection structure between the deceleration mechanism 90 and the output shaft 95, the increase of the number of components can be suppressed, and the actuator 20 which is functionally excellent can be realized.

Furthermore, according to the actuator 20 of the embodiment, the first gap S1 is arranged between the second support shaft 94e and the insertion hole 101, and the second gap S2 is arranged between the elastic member 100 and the second planetary carrier 94d.

Thereby, the elastic member 100 can be easily mounted on each second support shaft 94e, and the assembly property of the actuator 20 can be improved. In addition, when the actuator 20 is actuated, the elastic member 100 can be easily elastically deformed, and the reaction force of the elastic member 100 at this time can be suppressed from acting in the axial direction of the second planetary carrier 94d. Thus, even when the load applied to the actuator 20 is large, the smooth rotation of the deceleration mechanism 90 can be ensured.

Furthermore, by the arrangement of the first gap S1 and the second gap S2, although the rotation shake of the deceleration mechanism 90 including the plurality of gears is allowed, because the second support shaft 94e made of metal is in contact with the elastic member 100, the generation of the periodic noise due to the rotation shake can be effectively suppressed. Thus, even when the deceleration mechanism is configured by inexpensive components, the silent property can be ensured, and cost reduction can be realized.

In addition, according to the actuator 20 of the embodiment, the object to be driven of the actuator 20 is the tailgate 12 arranged in the vehicle 10, and the actuator 20 is formed in an elongated rod shape which is extended and contracted by the rotation of the output shaft 95. Thus, the actuator 20 can be easily set in place of a conventional rod-shaped gas spring used as a support device (a support device in which a high-pressure gas is sealed in a cylinder and a reaction force of this high-pressure gas is used as a spring).

Evidently, the disclosure is not limited to the above-described embodiment, and various modifications can be made without departing from the gist thereof. For example, in the above-described embodiment, it is shown that the actuator is used as the rod-shaped actuator 20 that opens and closes the tailgate 12 of the vehicle 10, but the disclosure is not limited thereto and can also be applied to an actuator used in other vehicle-mounted equipment such as a wiper device, a power window device, a sunroof device, a sliding door opening/closing device, and the like, and having a planetary gear mechanism.

In addition, the material, the shape, the dimension, the number, the setting location, and the like of each constituent in the above embodiment are arbitrary as long as the disclosure can be achieved, and are not limited to the above embodiment.

What is claimed is:

1. An actuator, comprising:
a motor portion in which a rotation shaft is arranged,
a drive shaft which drives an object to be driven, and
a deceleration gear portion which is arranged between the rotation shaft and the drive shaft, wherein
the deceleration gear portion comprises:
a sun gear which is rotated by the rotation shaft,
an internal gear which is arranged around the sun gear,
a plurality of planetary gears which are arranged between the sun gear and the internal gear, and
a planetary carrier which is equipped with a plurality of support shafts respectively rotatably supporting the plurality of planetary gears, and rotates the drive shaft, wherein
the support shafts are protruded to a drive shaft side in an axial direction of the planetary carrier,
a power transmission member having a plurality of convex portions which are protruded radially outward and receive rotation forces from the support shafts are arranged on a planetary carrier side of the drive shaft in the axial direction, and
an elastic member is arranged between the support shafts and the convex portions in a rotation direction of the drive shaft.

2. The actuator according to claim 1, wherein
the elastic member has
a plurality of support shaft insertion holes into which the support shafts are inserted, and
an engagement hole with which the power transmission member is engaged.

3. The actuator according to claim 2, wherein
gaps are arranged between the support shafts and the support shaft insertion holes, and between the elastic member and the planetary carrier.

4. The actuator according to claim 1, wherein
the object to be driven is an opening/closing body arranged in a vehicle, and
the actuator is formed in a rod shape which is extended and contracted by rotation of the drive shaft.

5. The actuator according to claim 2, wherein
the object to be driven is an opening/closing body arranged in a vehicle, and
the actuator is formed in a rod shape which is extended and contracted by rotation of the drive shaft.

6. The actuator according to claim 3, wherein
the object to be driven is an opening/closing body arranged in a vehicle, and
the actuator is formed in a rod shape which is extended and contracted by rotation of the drive shaft.

* * * * *